United States Patent [19] [11] 4,430,380
Hönel et al. [45] Feb. 7, 1984

[54] BONDED STRUCTURES OF TEXTILE MATERIALS

[75] Inventors: Hans Hönel; Walter Michel, both of Frankfurt am Main; Steffen Piesch, Oberursel; Karin Schlüter; Manfred Seidel, both of Frankfurt am Main; Wolfgang Spieler, Hofheim, all of Fed. Rep. of Germany

[73] Assignee: Cassella Aktiengesellschaft, Frankfurt am Main, Fed. Rep. of Germany

[21] Appl. No.: 360,217

[22] Filed: Mar. 22, 1982

[30] Foreign Application Priority Data

Mar. 26, 1981 [DE] Fed. Rep. of Germany ....... 3111936

[51] Int. Cl.$^3$ ................................................. B32B 7/00
[52] U.S. Cl. .................................... 428/254; 428/279; 428/280; 428/288; 428/290; 427/372.2; 427/389.9
[58] Field of Search ............... 428/254, 278, 280, 288, 428/290; 427/372.2, 389.9

[56] References Cited

U.S. PATENT DOCUMENTS 3,087,837  4/1963  Van Loo ............................. 428/254
4,303,561  12/1981  Piesch et al. ....................... 525/509
4,328,326  1/1982  Piesch et al. ....................... 525/509

FOREIGN PATENT DOCUMENTS 973992  9/1975  Canada .
673742  6/1952  United Kingdom .

Primary Examiner—Marion McCamish
Attorney, Agent, or Firm—Connolly and Hutz

[57] ABSTRACT

A bonded structure of textile materials bonded by a melamine-formaldehyde precondensate is produced by applying to a textile material a melamine-formaldehyde precondensate with a molar ratio of melamine to formaldehyde of 1:(0.8 to 1.26) to form a composite and then compressing the composite with an overpressure of 1 to 200 bars at temperature of from 130° to 220° C.

11 Claims, No Drawings

BONDED STRUCTURES OF TEXTILE MATERIALS

Bonded structures of textile materials can be produced by applying to the fibre material a thermosetting curable binder in a liquid or solid form and exposing the structure, if appropriate after a drying stage, to the action of an elevated temperature and of an elevated pressure. This cures the binder by crosslinking it by thermosetting and effects a bonding of the fibre material. The action of an elevated temperature and of an elevated pressure can also be associated with a shaping process.

Examples of suitable binders are precondensates of formaldehydes with phenols, with urea or with melamine. Cross-linkable epoxides or isocyanates can also be used as binders of this type. Binders based on phenol-formaldehyde precondensates impart to bonded fibre material structures produced therewith an odour of phenol, a frequently troublesome intrinsic colouration and a ready flammability, so that the use of such binders is restricted to such fields of application in which the above-mentioned properties can be tolerated. After the bonding of the structure, binders based on aminoplast resins still evolve, gradually and continuously, formaldehyde, not only, on the one hand, causing wastage, but, on the other hand, also prohibiting, for physiological reasons, the use of such binders in many areas. Epoxides and isocyanates are two-component systems and are therefore difficult to process.

It has now been found that it is possible to produce bonded structures of textile materials which structures have been bonded by the application of a melamine-formaldehyde precondensate and a subsequent action of an elevated temperature and of an elevated pressure and which are distinguished by an extremely low content of free formaldehyde or of formaldehyde to be liberated, when the melamine-formaldehyde precondensate used has a molar ratio of melamine:formaldehyde of 1:(0.8 to 1.26), preferably one of 1:(1.01 to 1.2).

Melamine-formaldehyde precondensate having a molar ratio of melamine:formaldehyde of 1:(0.8 to 1.26), preferably of 1:(1.01 to 1.2), can be prepared by heating melamine in an aqueous solution or suspension with formaldehyde in a molar ratio of 1:(0.8 to 1.26), preferably of 1:(1.01 to 1.2), at a pH value of 7 to 11, preferably 7.5 to 10.5, to temperatures of 105° to 160° C., preferably 110° to 130° C.

The resins which according to the present invention are used as binders can also be modified. The modification is carried out as in the preparation of other modified resins by adding modifying agents which are themselves known singly or in a mixture with one another before, during or after the condensation is complete. Examples of suitable modifying agents are carboxamides, such as acetamide, propionamide or benzamide, sulphonamides, such as benzene sulphonamide or p-toluene sulphonamide, glycols, such as ethylene glycol, 1,2-propylene glycol, 1,3-propylene glycol, 1,2-butanediol, 1,3-butanediol or 1,4-butanediol, telomeric glycols, such as, for example, diethylene glycol, triethylene glycol, tetraethylene glycol, dipropylene glycol, tripropylene glycol, or tetrapropylene glycol, polyglycols, and also polyglycerol, trimethylolpropane, pentaerythritol, sugars, such as glucose, polymeric sugars, such as, for example, starch or derivatives thereof, glycol ethers, such as propylene glycol monoethyl ether, dipropylene glycol monoethyl ether, tripropylene glycol monomethyl (or monoethyl) ether, and also alcohols, such as methanol or ethanol, lactams, such as ε-caprolactam, methylene-bis-formamide, a product from the reaction of formaldehyde, formamide and ε-caprolactam, methylene-bis-acrylamide, and alkali metal salts or alkaline earth metal salts of amidosulphonic acid, in particular the sodium salt of amidosulphonic acid. It is also possible to use, as modifying agents, other aminoplast formers and their derivatives alone or in a mixture with one another, for example urea, thiourea, propyleneurea, ethyleneurea, glyoxalurea, acetoguanamine, formoguanamine, benzoguanamine, adipo-bis-guanamine and the like. 0 to 25% by weight, preferably 0 to 15% by weight, of modifying agent is used relative to the total weight of melamine and formaldehyde employed (formaldehyde calculated at 100%).

Since the reaction temperatures are above the boiling point of water in the preparation of melamine-formaldehyde precondensates used according to the invention, the condensation is carried out in a closed pressure vessel (autoclave) under the over-pressure which establishes itself and, advantageously, while stirring. Formaldehyde is normally employed in the form of a customary 39% strength aqueous solution. However, aqueous solutions of paraformaldehyde or more or less concentrated formaldehyde solutions can also be used. The concentration of formaldehyde in the aqueous solution of the reaction batch can be 10 to 30% by weight.

The pH value of 7 to 11, preferably 7.5 to 10.5, to be maintained during the condensation is established by the addition of suitable inorganic or organic compounds which have an alkaline reaction. The examples of such inorganic compounds are alkali metal hydroxides, such as sodium hydroxide, potassium hydroxide or lithium hydroxide, or alkali metal carbonates, such as sodium carbonate or potassium carbonate. Examples of suitable organic compounds are amino-alcohols, preferably tertiary amino-alcohols, such as, for example, aminoethanol, 3-aminopropanol, N-methylaminoethanol, N-ethylaminoethanol, N,N-dimethylaminoethanol, N,N-diethylaminoethanol, N,N-dipropylaminoethanol, N,N-dimethyl-, -diethyl- or -dipropylaminopropanol. Mixtures of various suitable compounds which have an alkaline reaction can also be used, such as, for example, a mixture of potassium carbonate and N,N-dimethylaminoethanol. Compounds used for establishing the pH value can of course also be added to the reaction batch in the form of an aqueous solution. Establishing the pH value normally requires, for example, about 0.005 to 0.1% by weight of alkali metal hydroxides and about 0.5 to 2% by weight of tertiary amino-alcohols, relative to the weight of melamine.

In the preparation of melamine-formaldehyde precondensates to be used according to the invention, a relatively rapid dissolution of melamine occurs under the reaction conditions indicated even without the addition of modifying agents. Melamine is already dissolved 5 to 10 minutes after the condensation temperature has been reached. After the dissolution of melamine further condensation reduces the extent to which the batch can be diluted with water.

If, in the preparation of melamine-formaldehyde precondensates used according to the invention, an alkali metal salt or alkaline earth metal salt of amidosulphonic acid is used, for modifying purposes, in amounts of less than 1% by weight, relative to the total weight of melamine+formaldehyde (100%), then the condensation reaction is normally continued until the finished resin solution has reached a dilutability with water of 1:(0.1 to 4), preferably 1:(0.1 to 3.5). As is well known, dilutability with water is determined by titrating with water a measured volume of resin at a temperature of 20° C. until a permanent clouding occurs. For example, the statement dilutability with water 1:0.1 says that a permanent clouding occurs on mixing 1 part by volume of resin with 0.1 part by volume of water. To prepare a resin having a dilutability with water of, for example, 1:0.1, however, the condensation reaction must not be continued until a resin sample has this dilutability with water, but the condensation must already be terminated before this point by a rapid lowering of the temperature, because further condensation still takes place during the cooling down. The dilutability with water at which the condensation is to be terminated can readily be determined by preliminary experiments.

If, in the preparation of melamine-formaldehyde precondensates used according to the invention, an alkali metal salt or alkaline earth metal salt of amidosulphonic acid is used, for modifying purposes, in amounts of more than 7.5% by weight, relative to the total weight of melamine+formaldehyde (100%), the condensation reaction can be continued until an unlimited dilutability with water is reached. When modifying with salts of amidosulphonic acid in amounts of 1 to 7.5% by weight it depends on the type and amount of the remaining modifying agents whether or not an unlimited dilutability with water can be achieved. If necessary, a dilutability with water of 1:(0.1 to 4), preferably of 1:(0.1 to 3.5), is aimed at in the condensation reaction also in these cases.

In the preparation of resins to be used according to the invention the concentration of starting components are generally chosen such that approx. 50% strength resin solutions are produced. The resin solutions obtained can be used direct as binders, but they can also be advantageously converted into a solid form until the moment of application. This is carried out by drying by customary methods, for example under a reduced pressure at 50° C. Spray-drying is particularly advantageous since this produces at the same time also a pulverisation of the resin. It is advantageous for spray-drying that the resulting powder resins have high softening points even if they are highly modified.

Suitable starting material for bonded structures, according to the invention, of textile materials are woven fabrics, warp-knitted fabrics, weft-knitted fabrics, nonwovens, fleeces, felts and the like of natural or synthetic, inorganic, or, in particular, organic materials. Examples of suitable inorganic materials are glass wool, quartz wool, rock wool or slag wool, and fibres from asbestos or graphite. Examples of suitable organic materials are cellulose, wool, silk, polyamide, polyester, polypropylene and polyacrylonitrile. The materials are present in the textile materials to be bonded in the form of a sheet-like extension in thicknesses of up to a few centimeters.

The materials can be present in structures to be bonded in the form of threads, such as, for example, in warp-knitted fabrics, weft-knitted fabrics or random-laid webs, in the form of fibres or short ends of yarn, such as, for example, in felts, non-wovens or fleeces, or in the form of flocks or shreds, such as, for example, in shoddy webs.

A binder to be used according to the invention is applied in the form of a powder or granules or a solution to the structure to be bonded which is in piece form or in the form of a continuous web. The solution can originate direct from the preparation of the melamine-formaldehyde precondensates or it can be obtained by redissolving the powder resin in water or in a low molecular weight alcohol. 1 to 60% strength by weight aqueous, alcoholic or aqueous/alcoholic solutions of the binder are normally used. 1 to 250% by weight, preferably 10 to 100% by weight, of binder, relative to solid resin, are normally applied to the structure to be bonded which may be present in a prebonded form. When using a powder resin or granules, the application is carried out, for example, by powdering on or by dusting on, and when a solution of the binder is used by squirting on, spraying on, padding on, foaming on, knife-coating or impregnating. If no impregnation takes place, the binder can be applied to one or both surfaces of the sheet-like structure.

Binders to be used according to the invention have good flow during processing, but they are less reactive than resins which have a higher formaldehyde content. It is therefore normally advantageous to add to the binder to be applied curing agents which have a latent action and are in themselves known, to accelerate the rate of cure in a later cure. Latent curing agents of this type are latent acid donors, that is to say compounds which under the conditions of a cure of the resins split off substances which have an acid action. Examples of suitable curing agents are melamine salts of organic acids, such as melamine phthalate, melamine oxalate, and melamine acetate, the morpholine salt of p-toluene sulphonic acid, arylsulphonic acid esters, such as p-toluene sulphonic acid methyl, ethyl or phenyl ester, anhydrides of organic acids, such as succinic anhydride, phthalic anhydride, maleic anhydride and benzene tetracarboxylic acid anhydride, polyphosphoric acid esters, chlorides, nitrates, tosylates and sulphates, for example of magnesium, ammonium or zinc or of volatile organic bases, such as hydrazine, tertiary amines, amino-alcohols or their derivatives, and also alkali metal salts of aliphatic halogenocarboxylic acids, such as the sodium salt of chloroacetic acid or of $\beta$-chloropropionic acid and the like. The latent curing agents can be admixed to the powder resin or to the solution to be applied. However, it is also possible to add latent curing agents in the preparation of the resin solution or before its conversion into the powder resin. 0.1 to 5% by weight of curing agent, relative to solid resin, are normally used.

Other binders, fillers, dyestuffs, pigments or auxiliaries can also be applied to the structure to be bonded, either together with the binder to be used according to the invention or in a separate downstream or upstream process. Examples of other binders are polymer dispersions, such as acrylate copolymers, vinyl acetate monopolymers or copolymers, butadiene-styrene copolymers, butadiene-acrylonitrile copolymers, vinyl chloride copolymers, vinylidene chloride copolymers, other aminoplast resins, chloroprene and natural rubber.

Examples of suitable fillers are wood flour, cellulose powder, cellulose ester powder, rock flour, glass powder, cotton flock, cotton fibres, cotton fabric shreds, flour, starch, peat, asbestos fibres and mica or graphite, and pigments can be organic or inorganic. Suitable inorganic pigments are in general based on sulphides, oxides or mixed oxides of metals, in particular of titanium, zinc, iron, chromium, cobalt, lead and cadmium. The preferred black pigment is carbon black. All those compounds which are characterised in the Colour Index as "pigment dyes" are suitable for use as organic pigments.

Examples of auxiliaries are flow control agents, lubricants or release agents, hydrophobicity- or oleophobicity-imparting agents, and also agents for a flame-retardant finish or for an anti-static dressing.

Examples of known flow control agents are sorbitol, glycols and glycol derivatives and also polyglycols. Metal stearates, preferably zinc stearate, lithium stearate, calcium stearate or magnesium stearate, are used as lubricants or release agents which may be necessary for the satisfactory release of the bonded structure from the mould. Examples of hydrophobicity-imparting agents are commercially available paraffin and polysiloxane emulsions. Examples of agents for a flame-retardant finish are tetrahydroxymethylposphonium chloride or combinations of halogen-containing polymers and antimony oxide, and also phosphinic acid derivatives. Examples of oleophobicity-imparting agents are commercially available fluorine-containing copolymer dispersions.

When the binder to be used according to the invention has been applied to the material to be bonded in the form of a powder or granules, it is as a rule advantageous to sinter it to the material to be bonded before the actual bonding process. This sintering is effected by the action of heat, for example at temperatures of 100° to 200° C., in particular at 100° to 160° C., during a time interval of normally up to 3 minutes, preferably 30 to 90 seconds. It may be necessary to use longer times, for example up to 10 minutes, in the case of thicker materials. When the binder to be used according to the invention has been applied to the material to be bonded in the form of a solution, an intermediate drying stage, for example by hot air or infrared radiation, is advantageously carried out before the actual bonding process. After any sintering or any intermediate drying stage, the sheet-like structure, to which the binder to be used according to the invention and, if appropriate, other fillers or additives have been applied, is exposed, for bonding, to a temperature of 130° to 220° C., preferably 150° to 180° C., and an over-pressure of 1 to 200 bar, preferably 2 to 100 bar. Until the crosslinking of the binder by thermosetting is complete this stage requires periods of 30 seconds up to 20 minutes, preferably 1 to 4 minutes. The bonding can be combined with a three-dimensional shaping of the structure by application of suitable moulds. Planar and three-dimensionally shaped bonded structures which have a thickness of up to a few centimeters can be produced in this way. The dimensions of the material to be bonded are limited by the dimensions of the press. Web-shaped material is therefore correspondingly sub-divided beforehand. Depending on the processing conditions, in particular on the amount of binder applied, the surface character and stiffness of the bonded structure can be varied within wide limits. When small binder quantities are used only a small degree of bonding is achieved, and the original textile surface character remains substantially unchanged, whilst on using increasing amounts of binder an increasing degree of bonding and an increasingly more closed, that is to say smoother, surface are obtained.

It is also possible to treat several sheet-like structures with binder and then to press them against one another or together with other sheet-like structures.

Examples of uses of shaped articles which can be produced according to the present invention are shape-stable sheet-like and three-dimensionally shaped interior facings, exterior facings, insulation and protective linings, and also coverings and separations of textile and non-textile character, tubs and vessels, for example in means of transport and in the interior decoration of buildings, and also in the furniture and packaging industries, i.e. anywhere where chemically, mechanically and thermally stable, physiologically acceptable sheet-like articles and shaped articles are required.

Bonded structures according to the invention are distinguished by a low content on the goods of formaldehyde which is free or being liberated, and also by excellent mechanical, chemical and thermal stabilities, such as high strength, a high resistance to water and solvents and also reduced flammability.

The invention is explained in more detail by means of the examples which follow. Percentage data are percent by weight.

EXAMPLE 1

1,850 kg of melamine, 1,356 kg of aqueous 39% strength formaldehyde (molar ratio of melamine to formaldehyde=1:1.2), 1,553 kg of distilled water and 357 kg of a mixture of about 70% of ethyldiglycol, 20% of ethyltriglycol and 10% of ethyltetraglycol, and 1.6 kg of potassium hydroxide were initially introduced into a pressure-proof stainless steel stirred vessel. The pH value of the mixture was 10.0. The mixture was then heated and stirred at 112° to 115° C. and under an over-pressure of about 1 to 2.5 bars until a dilutability with water of 1:5 was reached. The mixture was then cooled to 45° C., and 28 kg of a 73% strength solution of morpholine tosylate in water were added. The dilutability with water was now 1:2. The solution was sprayed in a spray drier at an air temperature of 155° to 160° C. A colourless powder resin having a softening range from 102° to 112° C. was obtained.

EXAMPLE 2

6,000 g of melamine, 4,396 g of 39% strength aqueous formaldehyde (molar ratio of melamine to formaldehyde 1:1.2), 8,889 g of demineralised water, 1,449 g of the sodium salt of amidosulphonic acid and 5.2 g of potassium hydroxide were initially introduced into a pressure-proof stainless steel stirred vessel. The pH value of the mixture was 9.9. The mixture was then heated and stirred at 113° C. and under an over-pressure of about 1.3 bars until an unlimited dilutability with water was reached. The mixture was then cooled down and the solution was sprayed in a spray drier as in Example 1 to give a powder resin.

EXAMPLE 3

6,000 g of melamine, 4,396 g of 39% strength aqueous formaldehyde (molar ratio of melamine to formaldehyde 1:1.2), 5,032 g of demineralised water, 5.2 g of potassium hydroxide and 1,158 g of a mixture of about 70% of ethyldiglycol, 20% of ethyltriglycol and 10% of ethyltetraglycol were initially introduced into a pressure-proof stainless steel stirred vessel. The pH value of the mixture was 10.5. The mixture was then heated and stirred at 115° C. and under an over-pressure of about 0.8 to 1.0 bar until a dilutability with water of 1:4 was reached. The mixture was then cooled down, the dilutability of the water was now 1:0.24, and the solution was dried at 50° C. in vacuo and then pulverised.

EXAMPLE 4

7,037 g of melamine, 5,156 g of 39% strength aqueous formaldehyde (molar ratio of melamine to formaldehyde 1:1.2), 5,902 g of demineralised water, 6.1 g of potassium hydroxide, and 453 g of a mixture of about 70% ethyldiglycol, 20% of ethyltriglycol and 10% of ethyltetraglycol and 453 g of p-toluenesulphonamide were initially introduced into a pressure-proof stainless steel stirred vessel. The pH value of the mixture was 9.5. The mixture was then heated and stirred at 110° to 117° C. and under an over-pressure of about 1.4 to 1.6 bar until a dilutability with water of 1:1.0 was reached. The mixture was then cooled down, the dilutability with water was now 1:0.43, and the solution was sprayed as in Example 1 to give a powder resin.

EXAMPLE 5

3,000 g of melamine, 2,198 g of 39% strength aqueous formaldehyde (molar ratio of melamine to formaldehyde 1:1.2), 4,445 g of demineralised water, 1,149 g of sodium salt of amidosulphonic acid, 2.6 g of potassium hydroxide, 579 g of a mixture of 70% of ethyldiglycol, 20% of ethyltriglycol and 10% of ethyltetraglycol and 193 g of 1,4-butanediol were initially introduced into a pressure-proof stainless steel stirred vessel. The pH value of the mixture was 10.0. The mixture was then heated and stirred at 110° to 111° C. and under an over-pressure of about 1.2 bars until an unlimited dilutability with water was reached. It was then cooled down and the solution was sprayed in a spray drier as in Example 1 to give a powder resin.

EXAMPLE 6

3,000 g of melamine, 1,465 g of 39% strength aqueous formaldehyde (molar ratio of melamine to formaldehyde 1:0.8), 2,677 g of distilled water, 536 g of a mixture of 70% ethyldiglycol, 20% of ethyltriglycol and 10% of ethyltetraglycol, 179 g of p-toluenesulphonamide and 2.9 g of potassium hydroxide were initially introduced into a pressure-proof stainless steel stirred vessel. The pH value of the mixture was 9.6. The mixture was heated for about 3 minutes at 127° C. under an over-pressure of 2.5 bars until a dilutability with water of 1:1 was reached. It was then cooled down, the dilutability with water was now 1:0.2, and the solution was sprayed as indicated in Example 1 to give a powder resin.

EXAMPLE 7

3,000 g of melamine, 1,648 g of a 39% strength aqueous formaldehyde (molar ratio of melamine to formaldehyde 1:0.9), 2,638 g of distilled water, 182 g of a mixture of 70% of ethyldiglycol, 20% of ethyltriglycol and 10% of ethyltetraglycol, 182 g of p-toluenesulphonamide and 2.6 g of potassium hydroxide were initially introduced into a pressure-proof stainless steel stirred vessel. The pH value of the mixture was 9.9. The mixture was then heated for about 3 minutes at 123° C. and under an over-pressure of 2.3 bars. After the cooling-down the dilutability with water of the resin was 1:0.4. The solution will be sprayed as indicated in Example 1 to give a powder resin.

EXAMPLE 8

3,000 g of melamine, 2,198 g of 39% strength aqueous formaldehyde (molar ratio of melamine to formaldehyde 1:1.2), 2,516 g of distilled water and 2.6 g of potassium hydroxide were initially introduced into a pressure-proof stainless steel stirred vessel. The pH value of the mixture was 10.1. The mixture was heated for 18 minutes at 117° to 120° C. and under an over-pressure of 1.7 bars. After the cooling-down the dilutability with water was 1:0.1. The solution was sprayed as indicated in Example 1 to give a powder resin.

EXAMPLE 9

3,000 g of melamine, 1,923 g of 39% strength aqueous formaldehyde (molar ratio of melamine to formaldehyde 1:1.05), 2,577 g of distilled water, 376 g of a mixture of 70% of ethyldiglycol, 20% of ethyltriglycol and 10% of ethyltetraglycol, 188 g of p-toluenesulphonamide and 2.4 g of potassium hydroxide were initially introduced into a pressure-proof stainless steel stirred vessel. The pH value of the mixture was 9.7. The mixture was then heated for about 6 minutes at 114° C. and under an over-pressure of 1.5 bars. After the cooling-down the dilutability with water was 1:0.8. The solution was sprayed as indicated in Example 1 to give a powder resin.

EXAMPLE 10

3,000 g of melamine, 2,198 g of 39% strength aqueous formaldehyde (molar ratio of melamine to formaldehyde 1:1.2), 4,445 g of distilled water, 725 g of a 40% strength aqueous solution of the sodium salt of amidosulphonic acid, 386 g of a mixture of 70% of ethyldiglycol, 20% of ethyltriglycol and 10% of ethyltetraglycol and 2.6 g of potassium hydroxide were initially introduced into a pressure-proof stainless steel stirred vessel. The pH value of the mixture was 9.7. The mixture was then heated and stirred for about 19 minutes at 112° C. After cooling down the solution had a dilutability with water of 1:1 and had a shelf life of several weeks.

EXAMPLE 11

A polyester random-laid web (spunbonded PES) with a weight of 300 g/m² was impregnated with a water/n-propanol solution (volume ratio of 1:1) which contained, per kilogram, 450 g of a powder resin in accordance with Example 3 and 25 g of a 35% strength aqueous solution of 1-amino-2-methyl-2-hydroxypropane as a curing agent. The amount of liquid applied in the impregnation was 140%, which was then reduced to a volatile content of 3 to 4% by drying at 110° C. Two of the sheet-like structures thus treated were compressed against one another at 160° C. for 4 minutes with a pressure of 50 bars to give a compressed thickness of 1 mm. The result was a bonded material which is highly suitable as a covering material in the construction of cars.

EXAMPLE 11a

The above Example 11 was repeated using a commercially available non-etherified melamine-formaldehyde powder resin having a molar ratio of melamine to formaldehyde of 1:1.8 and which was modified with 6% of sucrose and had a dilutability with water of 1:0.6 in a 50% strength solution.

EXAMPLE 11b

The above Example 11 was repeated using a commercially available non-etherified melamine-formaldehyde powder resin having a molar ratio of melamine to formaldehyde of 1:1.7 and which had been modified with 5% of phenoxyethanol and had a dilutability with water of 1:1.3 in a 50% solution.

EXAMPLE 11c

The above Example 11 was repeated using a commercially available etherified melamine-formaldehyde liquid resin having a molar ratio of melamine:formaldehyde:OCH$_3$ of 1:2.2:1.3.

EXAMPLE 11d

The above Example 11 was repeated using a commercially available etherified melamine-formaldehyde liquid resin having a molar ratio of melamine:formaldehyde:OCH$_3$ of 1:3.4:2.3.

The formaldehyde content of the goods and the tensile strength of the products obtained by Examples 11 to 11d were determined. The formaldehyde content was determined by the AATCC method 112-75 (AATCC=American Association of Textile Chemists and Colorists).

It may be added as a supplementary remark that this method was modified in that test pieces were stored at 80° C. in a closed system over water but the remaining conditions were retained unchanged. This so modified, more exacting method is termed AATCC method 112-75, 80° C., in the text which follows.

The tensile strength was determined in this example and in the examples which follow on a tensile test machine, the shape of the sample piece being in accordance with DIN 53,571. The tensile test was carried out in accordance with DIN 53,857/1 with a sample width of 20 mm, a measuring distance of 50 mm and a test velocity of 100 mm/min. The tensile strength of the materials was also tested after two machine boil washes at 90° C. in a customary domestic drum washing machine having a capacity of 5 kg in the presence of a commercially available household detergent. The amount of detergent added was 10 g/l. Afterwards the goods were rinsed and dried.

The value obtained for formaldehyde content and tensile strength are given in Table 1.

TABLE 1

| Product in accordance with Example | 11 | 11a | 11b | 11c | 11d |
|---|---|---|---|---|---|
| Formaldehyde in ppm in accordance with | | | | | |
| AATCC 112-75 | 480 | 1,370 | 1,010 | 2,350 | 3,380 |
| AATCC 112-75 80° C. | 2,350 | 8,000 | 8,000 | 8,000 | 8,000 |
| Tensile strength in daN | | | | | |
| At first | 95.9 | 87.4 | 84.6 | 99.1 | 93.2 |
| After a 2-fold machine wash at 90° C. | 95.1 | 85.2 | 83.8 | 98.3 | 86.2 |

Formaldehyde content on the goods in ppm and tensile strength in daN.

It can be seen from Table 1 that the shaped article according to the invention in accordance with Example 11 is distinguished by markedly lower contents on the goods of formaldehyde which is free or being liberated and by a satisfactory wash-resistant bonding. On repeating Example 11 with resins in accordance with Examples 6, 7 or 9, shaped articles having somewhat more advantageous formaldehyde contents on the goods were obtained.

EXAMPLE 12

A powder resin prepared in accordance with Example 1 was dusted as evenly as possible onto a web material which had a weight of 1,400 g/m$^2$ and consisted of flock material containing predominantly cellulose fibre material. The quantity applied was 50% by weight relative to the fibre material. The resin powder was then sintered on for 3 minutes at 160° C., and the material was compressed for 4 minutes in a frame press at 180° C. and under a pressure of 20 bars to give a thickness of 1.5 mm. The product obtained is suitable for use as interior facing and protective lining. The bonded sheet-like structure is distinguished to a high degree by its strength while having a good resistance to water and solvents, by a very high heat-stability and in particular by a low content on the material of formaldehyde which is free or being liberated. The tensile strength was determined by the method already described. It was 98 daN and after a 2-fold machine boil wash as described 96 daN.

EXAMPLE 12a

Example 12 was repeated with a commercially available pulverulent non-etherified melamine resin having a molar ratio of melamine to formaldehyde of 1:1.65, which had been modified with 4.2% of sorbitol and had a dilutability with water of 1:1.1 in a 50% strength solution. The formaldehyde content on the goods was determined on the products obtained in accordance with the Examples 12 and 12a. In addition to the two methods already mentioned the method 112-73 which is in accordance with Japanese law was also used. The values obtained are given in Table 2.

TABLE 2

| | Formaldehyde in ppm on the goods. | |
|---|---|---|
| Name of Method | Example 12 | Example 12a |
| Japanese Law No. 112-73 | 180 | 320 |
| AATCC 112-75 | 490 | 1,000 |
| AATCC 112-75, 80° C. | 1,790 | 8,000 |

EXAMPLE 13

The powder resin prepared according to Example 4 was mixed with 1% by weight of the morpholine salt of p-toluenesulphonic acid as a curing agent, and this mixture was sprinkled, as evenly as possible, onto material also used in Example 12. The amount applied relative to the fibre material, was 40% by weight. The material was then compressed for 3 minutes at 160° C. and under a pressure of 10 bars to give a thickness of 2 mm. The bonded material obtained is suitable for use as thin insulation and covering material in the construction of cars. The formaldehyde content on the goods and the tensile strength were determined by the methods already described. This produced the results which follow:

TABLE 3

| Formaldehyde in ppm on the goods. | |
|---|---|
| Japanese Law 112-73 | 150 |
| AATCC 112-75 | 860 |
| Tensile strength in daN | |
| At first | 52.2 |
| After a two-fold machine | 43.0 |

TABLE 3-continued

| Formaldehyde in ppm on the goods. |
| --- |
| wash at 90° C. |

EXAMPLE 14

A web material used in Example 12 is dusted with a resin powder as indicated in Example 11 and compressed under the conditions given in Example 12 against a mechanically prebonded and finished needle-punched felt which has a weight of 300 g/m².

The polyester needle-punched felt had beforehand been impregnated with a commercially available oleophobicity/hydrophobicity-imparting agent based on a fluoro-copolymer dispersion and with the use of a highly methylolated, highly methyl-etherified water-soluble melamine resin (molar ratio of melamine to formaldehyde 1:5.8, and 90% of the methylol groups etherified by methyl) and zinc nitrate as a catalyst. The liquor contained 5 g/l of this oleophobicity-imparting agent and also 3 g/l of the 50% strength melamine resin and 3 g/l of zinc nitrate. The liquor pick-up in the impregnation was 110%. The material was then dried at 110° C., and the needle-punched felt was then dusted on one side with the mixture of powder resin and curing agent used in Example 12, the amount applied being 10% by weight, relative to the fibre material. Sintering was then carried out for a brief period at 160° C., and thereafter the two parts were compressed against one another under the conditions mentioned in Example 12 and at the same time three-dimensionally shaped. The shaped bonded sheet-like structure is suitable for use as an inner roof lining in the construction of car bodies and it has a surface which is distinguished by a spray value of 80 (measured in accordance with the AATCC Method 22-1952) and an oil repellency of 5 (measured according to the AATCC Method 118-1966). When the resin in accordance with Example 1 was replaced by a resin in accordance with Examples 8, 9 or 10 plus a curing agent, in the above example, comparable products were obtained.

EXAMPLE 15

A polyester random-laid web which had a weight of 300 g/m² was powdered on one side with 40% by weight, relative to the fibre material, of the powder resin in accordance with Example 1, sintered at 160° C. and compressed against an untreated polyester random-laid web of the same quality for 4 minutes at 180° C. and under 50 bars to give a thickness of 1 mm. The bonded material obtained was suitable as an interior facing. The laminated materials are distinguished by a high tenacity and a high resistance to moisture. The tenacity was determined in accordance with DIN 53,530. The following values were obtained:

TABLE 4

| Tenacity (DIN 53,530) | | Treated | Untreated |
| --- | --- | --- | --- |
| At the start | daN | <9.3 | 0.2 |
| After 3-fold machine boil wash at 90° | daN | <9.8 | 0 |

EXAMPLE 15

The powder resin prepared according to Example 3 was mixed with 1% by weight of the morpholine salt of amidosulphonic acid as a curing agent and this mixture was applied as evenly as possible to one side of a polyester random-laid web which had a weight of 300 g/m²; amount applied: 250%. The material was then compressed for 4 minutes at 160° C. under a pressure of 20 bars to give a thickness of 0.5 mm. A sheet-like structure was obtained which had a closed, glossy, waxcloth-type surface resistant to water and organic solvents. The formaldehyde content on the goods and the tensile strength were determined by the methods already described. This produced the following results:

TABLE 5

| Test | Treated | Untreated |
| --- | --- | --- |
| Formaldehyde in ppm on the goods | | |
| Japanese Law No. 112-73 | 29 | 8 |
| AATCC 112-75 | 501 | 11 |
| Tensile strength in daN | | |
| At the start | 25.2 | 20.4 |
| After one machine wash at 90° C. | 27.0 | 22.1 |

What is claimed is:

1. In a bonded structure of textile materials bonded by a melamine-formaldehyde precondensate and cured at an elevated temperature and a elevated pressure, the improvement comprises said melamine-formaldehyde precondensate having been prepared by heating melamine in an aqueous solution or suspension with formaldehyde in a molar ratio of 1:(0.8 to 1.26) at a pH value of 7-11 in the presence of 1 to 25% by weight of modifying agents relative to the total weight of melamine and formaldehyde, and at least 1.0% being an alkali metal salt or alkaline earth metal salt of amidosulphonic acid, at temperatures of 105° to 160° C. until a limited dilutability with water is achieved or further heating until an unlimited dilutability with water is achieved.

2. The bonded structure according to claim 1 wherein said melamine-formaldehyde precondensate contains at least 7.5% by weight relative to the total weight of melamine and formaldehyde of an alkali metal salt or alkaline earth metal salt of amidosulphonic acid.

3. The bonded structure according to claim 1 wherein said modifying agents are selected from the group consisting of carboxyamides, sulphonamides, glycols, polyglycols, polyglycerol, trimethylolpropane, pentaerythritol, sugars, polymeric sugars, glycol esters, alcohols, ε-caprolactam, methylene-bis-formamide, methylene-bis-acrylamide, a reaction product of formaldehyde/-formamide/ε-caprolactam, urea, thiourea, propyleneurea, ethyleneurea, glyoxalurea, acetoguanamine, formoguanamine, benzoguanamine, and adipo-bis-guanamine.

4. The bonded structure according to claim 1 wherein said melamine-formaldehyde precondensate has a molar ratio of melamine to formaldehyde of 1:(1.01 to 1.2).

5. The process for production of a bonded textile structure according to claim 1 or claim 4 comprising applying 1 to 250% by weight, of a resin to a textile material wherein said resin is a melamine-formaldehyde precondensate having been prepared by heating melamine in an aqueous solution or suspension with formaldehyde in a molar ration of 1:(0.8 to 1.26) at a pH value of 7-11 in the presence of 1 to 25% by weight of modifying agents relative to the total weight of melamine and formaldehyde, and at least 1.0% being an alkali metal salt or alkaline earth metal salt of adiposulphonic acid, at temperatures of 105° to 160° C. until a limited dilutability with water is achieved or further heating until an unlimited dilutability with water is achieved and, compressing the textile material/resin composite with an over-pressure of 1 to 200 bars and at temperatures of 13° to 220° C.

6. The process according to claim 5 wherein said composite is compressed with an over-pressure of 2 to 100 bars.

7. The process according to claim 5 wherein said precondensate has a molar ratio of melamine to formaldehyde of 1:(1.01 to 1.2).

8. The process according to claim 5 wherein said resin is applied in the form of a aqueous, alcoholic or aqueous/alcoholic solution of 1 to 60% by weight of resin.

9. The process according to claim 5 wherein said compression is in the presence of 0.1 to 5% by weight, relative to solid resin, of a latent curing agent.

10. The process according to claim 5 wherein said compression is at temperatures of 150° to 180° C.

11. The process according to claim 5 wherein said resin is applied to the textile material in the form of a solid powder and is sintered-on prior to compression.

* * * * *